US012368796B2

(12) United States Patent
Kim

(10) Patent No.: US 12,368,796 B2
(45) Date of Patent: Jul. 22, 2025

(54) ACCESSORY AND ELECTRONIC DEVICE INCLUDING THE SAME

(71) Applicant: SAMSUNG ELECTRONICS CO., LTD., Suwon-si (KR)

(72) Inventor: Baekki Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 434 days.

(21) Appl. No.: 17/985,111

(22) Filed: Nov. 10, 2022

(65) Prior Publication Data
US 2023/0156108 A1    May 18, 2023

Related U.S. Application Data

(63) Continuation of application No. PCT/KR2022/017549, filed on Nov. 9, 2022.

(30) Foreign Application Priority Data

Nov. 12, 2021  (KR) .......................... 10-2021-0155868
Feb. 4, 2022   (KR) .......................... 10-2022-0014614

(51) Int. Cl.
    *H04M 1/04*    (2006.01)
(52) U.S. Cl.
    CPC ..................... *H04M 1/04* (2013.01)
(58) Field of Classification Search
    CPC .................. H04M 1/04; H04M 1/0214
    USPC ....................................................... 455/575.1
    See application file for complete search history.

(56) References Cited

U.S. PATENT DOCUMENTS

| 4,573,655 A * | 3/1986 | Vulic ...................... F16C 11/10 403/53 |
| 10,520,992 B1* | 12/2019 | Chang .................. H05K 5/0226 |
| 10,754,395 B2* | 8/2020 | Sanchez ............... H05K 5/0086 |
| 10,761,573 B2* | 9/2020 | Hsu ........................ G06F 1/1681 |

(Continued)

FOREIGN PATENT DOCUMENTS

| CN | 202353634 U |   | 7/2012 |
| CN | 203504632 U | * | 3/2014 |

(Continued)

OTHER PUBLICATIONS

International Search Report mailed Feb. 16, 2023 for PCT/KR2022/017549.

*Primary Examiner* — Mahendra R Patel
(74) *Attorney, Agent, or Firm* — CANTOR COLBURN LLP

(57) ABSTRACT

An accessory for an electronic device includes a coupler detachably attachable to the electronic device, and a support coupled with the coupler to be pivotable between a first position and a second position. The support includes a fixing member coupled with the coupler, a hinge member coupled with the fixing member to rotate around a first rotation axis, a first support member coupled with the hinge member, to pivot around the first rotation axis along with a rotation of the hinge member and to rotate around a second rotation axis intersecting with the first rotation axis, and a second support member extending from an end of the first support member to revolve around the first rotation axis along with a pivoting of the first support member, and to pivot around the second rotation axis along with a rotation of the first support member.

20 Claims, 14 Drawing Sheets

(56) References Cited

U.S. PATENT DOCUMENTS

| | | | | |
|---|---|---|---|---|
| 11,737,223 B2* | 8/2023 | Lee | ............... | H04M 1/0216 361/809 |
| 11,812,569 B2* | 11/2023 | Liu | ............... | H05K 5/0226 |
| 2002/0066630 A1* | 6/2002 | Brown, Sr. | ............... | A47B 23/04 190/11 |
| 2008/0271288 A1* | 11/2008 | Senatori | ............... | G06F 1/1616 16/221 |
| 2008/0314941 A1* | 12/2008 | Knych | ............... | G06F 1/1626 224/191 |
| 2011/0088218 A1* | 4/2011 | Yong | ............... | H04M 1/0239 16/297 |
| 2015/0028185 A1* | 1/2015 | Mack | ............... | G06F 1/16 248/688 |
| 2015/0346777 A1* | 12/2015 | Hosoya | ............... | G06F 1/166 248/447 |
| 2015/0378397 A1* | 12/2015 | Park | ............... | G06F 1/1656 361/679.27 |
| 2020/0274957 A1* | 8/2020 | Ham | ............... | H04M 1/026 |
| 2021/0022257 A1* | 1/2021 | Yu | ............... | H05K 5/0017 |
| 2021/0298438 A1* | 9/2021 | Beeler | ............... | A45C 11/00 |

FOREIGN PATENT DOCUMENTS

| | | | | |
|---|---|---|---|---|
| CN | 204069095 U | | 12/2014 | |
| CN | 111457227 A | * | 7/2020 | ............ F16M 13/005 |
| CN | 213637856 U | | 7/2021 | |
| KR | 20010079418 A | | 8/2001 | |
| KR | 100797626 B1 | | 1/2008 | |
| KR | 100896671 B1 | | 5/2009 | |
| KR | 101464254 B1 | | 11/2014 | |
| KR | 102202969 B1 | | 1/2021 | |
| WO | WO-2011156275 A2 | * | 12/2011 | ............ A45C 11/00 |
| WO | WO-2021194561 A1 | * | 9/2021 | ............ A45C 11/00 |

* cited by examiner

ACCESSORY AND ELECTRONIC DEVICE INCLUDING THE SAME

CROSS-REFERENCE TO RELATED APPLICATION(S)

This application is a continuation application, claiming priority under § 365 (c), of an International application No. PCT/KR2022/017549, filed on Nov. 9, 2022, which is based on and claims the benefit of a Korean patent application number 10-2021-0155868, filed on Nov. 12, 2021, in the Korean Intellectual Property Office, of a Korean patent application number 10-2022-0014614, filed on Feb. 4, 2022, in the Korean Intellectual Property Office, the disclosures of all of which are incorporated by reference herein in their entireties.

TECHNICAL FIELD

Various embodiments of the disclosure relate to an electronic device, and more particularly, an accessory and/or an electronic device including the accessory.

BACKGROUND ART

An electronic device refers to a device that performs a specific function according to a loaded program, such as a home appliance, an electronic notebook, a portable multimedia player, a mobile communication terminal, a tablet PC, a video/audio device, a desktop/laptop computer, or a vehicle navigation device. For example, these electronic devices may output stored information as sound or an image. As the integration level of electronic devices increases, and high-speed and large-capacity wireless communication becomes common, a single electronic device such as a mobile communication terminal may be equipped with various functions. For example, an entertainment function such as games, a multimedia function such as music/video playback, a communication and security function for mobile banking, and/or scheduling or an electronic wallet function as well as a communication function are integrated into one electronic device.

As electronic devices such as mobile communication terminals and smartphones have become popular, the electronic devices are treated as one of daily necessities. For such electronic devices, various types of accessories have been released in the aftermarket, and accessories may be used to add functions of the electronic devices and improve the performance, portability, and use convenience of the electronic devices. In the aftermarket, for example, a protective case provides a space for holding a card therein, beyond a simple protection function, thus making it convenient to carry belongings. A cradle in a living space, inside a vehicle, or in leisure activities may allow a user to freely take activities while using an electronic device. An auxiliary battery supplements the limited power capacity of the electronic device, and/or an accessory that may be coupled/combined with a smartphone such as a simple point of sales (POS) terminal may contribute to increasing the work efficiency of a designated field of work.

The above information is presented as background information only to assist with an understanding of the disclosure. No determination has been made, and no assertion is made, as to whether any of the above might be applicable as prior art with regard to the disclosure.

DISCLOSURE

Technical Problem

Accessories enabling protection, improved usability, and/or expansion of functions or performance together may be desired. For example, although an accessory that combines a protective case with a holding function or a card storage function is commercially available, it may be difficult to mount the electronic device in a state where the accessory is coupled with an electronic device on an in-vehicle cradle or couple the electronic device to a simple point of sales (POS) terminal.

Various embodiments of the disclosure are to address at least the above-mentioned problems and/or disadvantages and to provide at least the advantages described below: Accordingly, various embodiments of the disclosure may provide an accessory which enables storage of a belonging (e.g., a credit card or an identification (ID) card), while protecting an electronic device, and which is available as a storage medium, a card reader, and/or an auxiliary power source, and/or an electronic device including the accessory.

Various embodiments of the disclosure may provide an accessory available as a flat cradle or a wall mount holder to improve use convenience of an electronic device, and/or an electronic device including the accessory.

Additional aspects according to various embodiments will be presented through the detailed description set forth below, and may be apparent in part from the description or understood from the presented embodiments of the implementation.

Technical Solution

According to various embodiments of the disclosure, an accessory for an electronic device, and/or an electronic device including the accessory includes a coupler detachably attachable to the electronic device, and a support coupled with the coupler to be pivotable between a first position at which the support contacts one surface of the coupler and a second position at which the support is inclined to the one surface of the coupler. In such embodiments, the support includes a fixing member coupled with the coupler, a hinge member coupled with the fixing member, where the hinge member rotates around a first rotation axis with respect to the fixing member, a first support member coupled with the hinge member, where the first support member pivots around the first rotation axis along with a rotation of the hinge member, and rotates around a second rotation axis intersecting with the first rotation axis with respect to the hinge member, and a second support member extending from an end of the first support member, where the second support member revolves around the first rotation axis along with a pivoting of the first support member, and pivots around the second rotation axis along with a rotation of the first support member.

According to various embodiments of the disclosure, an electronic device includes a body and an accessory detachably attachable to the body. In such embodiments, the accessory includes a coupler detachably attachable to at least one surface of the body, and a support coupled with the coupler to be pivotable between a first position at which the support contacts one surface of the coupler and a second position at which the support is inclined to the one surface of the coupler. In such embodiments, the support includes a fixing member coupled with the coupler, a hinge member coupled with the fixing member, where the hinge member rotates around a first rotation axis with respect to the fixing member, a first support member coupled with the hinge member, where the first support member pivots around the first rotation axis along with a rotation of the hinge member, and rotates around a second rotation axis intersecting with the first rotation axis with respect to the hinge member, and a second support member extending from an end of the first support member, where the second support member revolves around the first rotation axis along with the a pivoting of the first support member, and pivots around the second rotation axis along with a rotation of the first support member.

Advantageous Effects

According to various embodiments of the disclosure, as an accessory rotates (or pivots) at least a part of a support around two axes, the accessory may position the support to be inclined to a body or coupler of an electronic device in various angular directions. For example, the accessory may hold the electronic device in various directions or at various inclination angles with respect to a plane, thereby increasing use convenience. In an embodiment, the accessory may be used as a wall-mounted holder according to the rotation position of the support with respect to the coupler, so that the electronic device may be conveniently held in a typical living space or inside a vehicle. In a certain embodiment, because a storage space, a storage medium, an integrated circuit (IC) chip reader, a battery, or various communication antennas are disposed in an area or space surrounded by the support on one surface of the coupler, the accessory may be electrically coupled to the body of the electronic device, which is useful for function extension of the electronic device. Besides the above effect, the disclosure may provide various other effects which are directly or indirectly identified.

DESCRIPTION OF THE DRAWINGS

The above and other features of various embodiments of the disclosure will be more apparent from the following description taken in conjunction with the accompanying drawings, in which.

Throughout the drawings, like reference numerals may be assigned to like parts, components, and structures.

MODE FOR INVENTION

Figure 1:
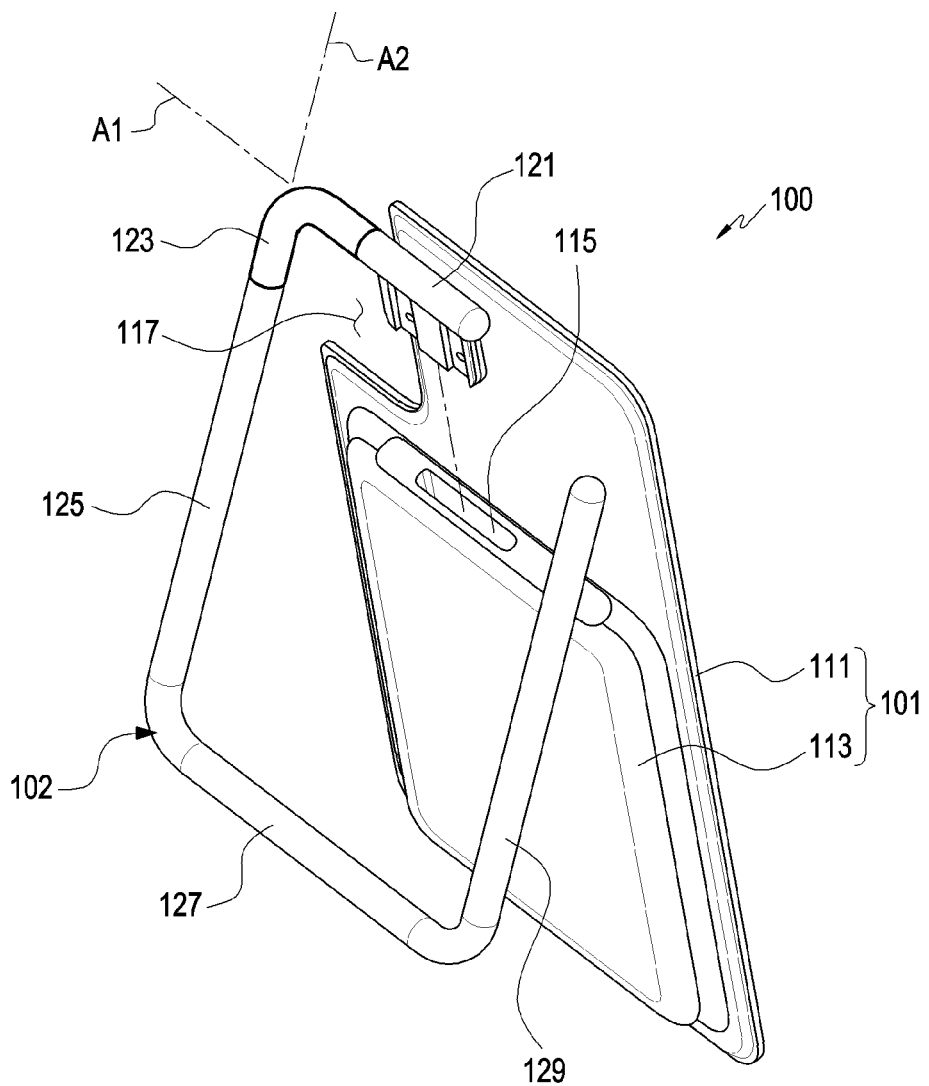
FIG. 1 is an exploded perspective view illustrating an accessory according to various embodiments of the disclosure.

The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine (e.g., an electronic device). For example, a processor (e.g., a processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
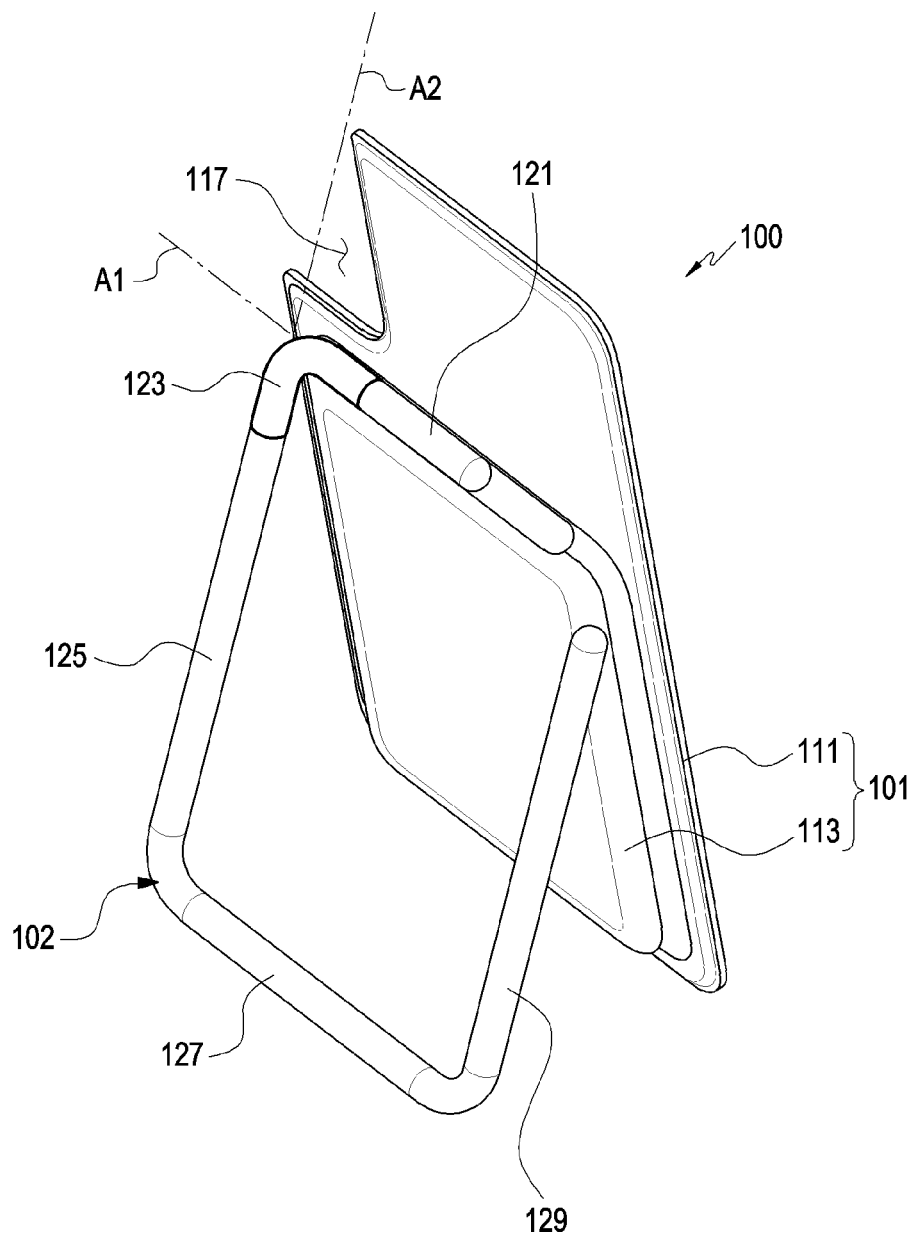
FIG. 2 is a perspective view illustrating an accessory according to various embodiments of the disclosure.

FIG. 1 is an exploded perspective view illustrating an accessory 100 according to various embodiments of the disclosure. FIG. 2 is a perspective view illustrating the accessory 100 according to various embodiments of the disclosure.

Figure 6:
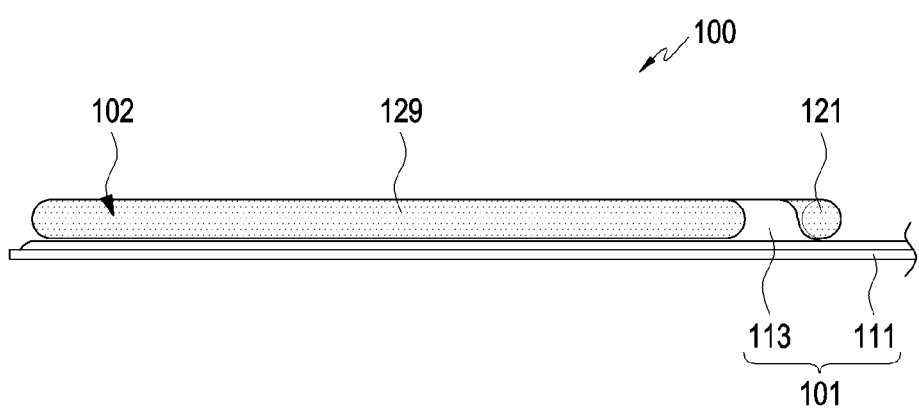
FIG. 6 is a side view illustrating an accessory according to various embodiments of the disclosure.
Figure 7:
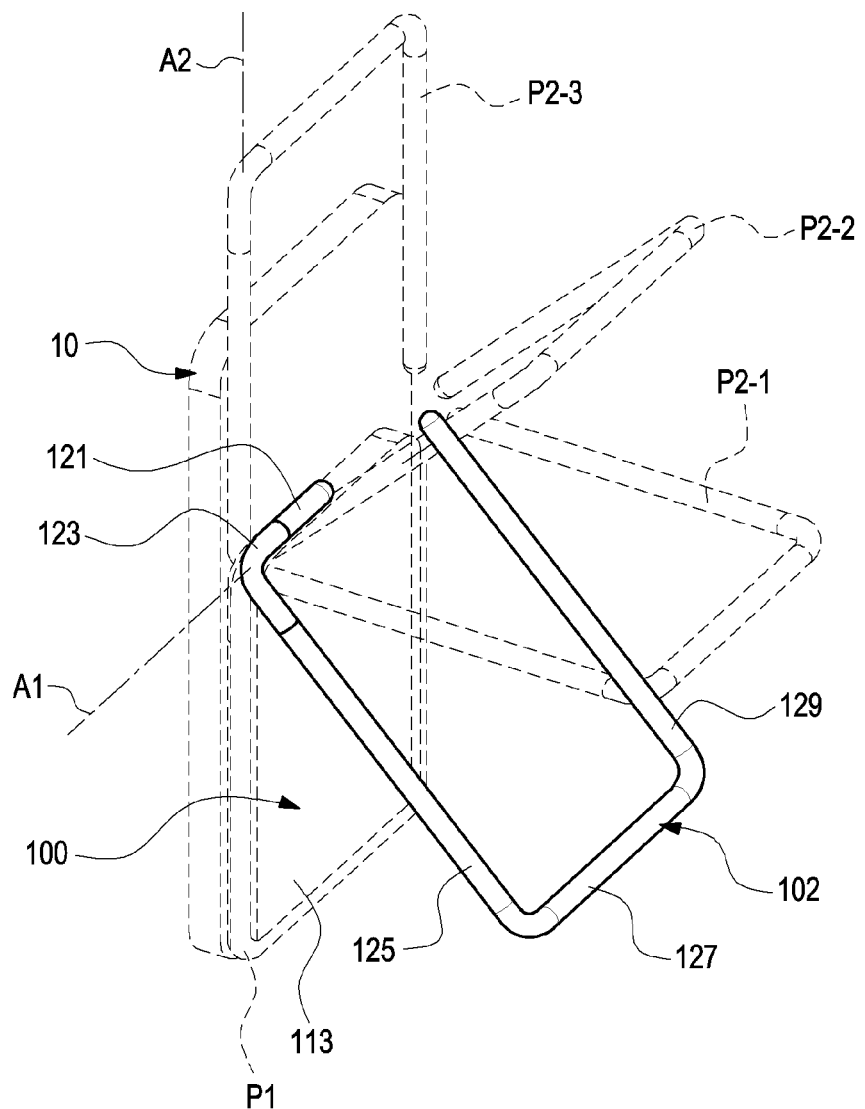
FIG. 7 is a diagram illustrating rotation of a part of a support around a first rotation axis in an accessory according to various embodiments of the disclosure.
Figure 8:
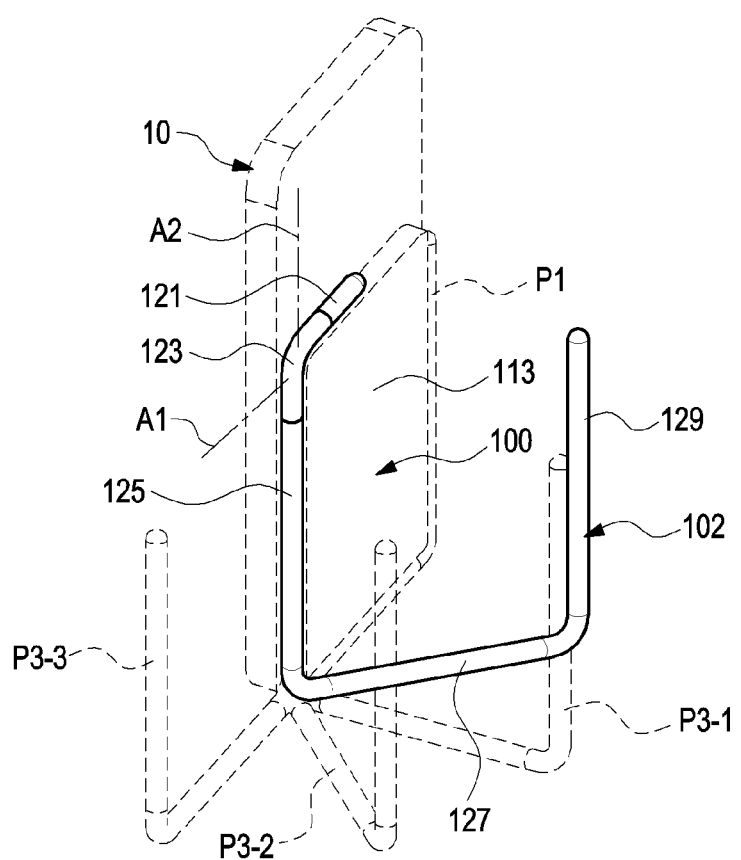
FIG. 8 is a diagram illustrating rotation of another part of the support around a second rotation axis in the accessory according to various embodiments of the disclosure.
Figure 12:
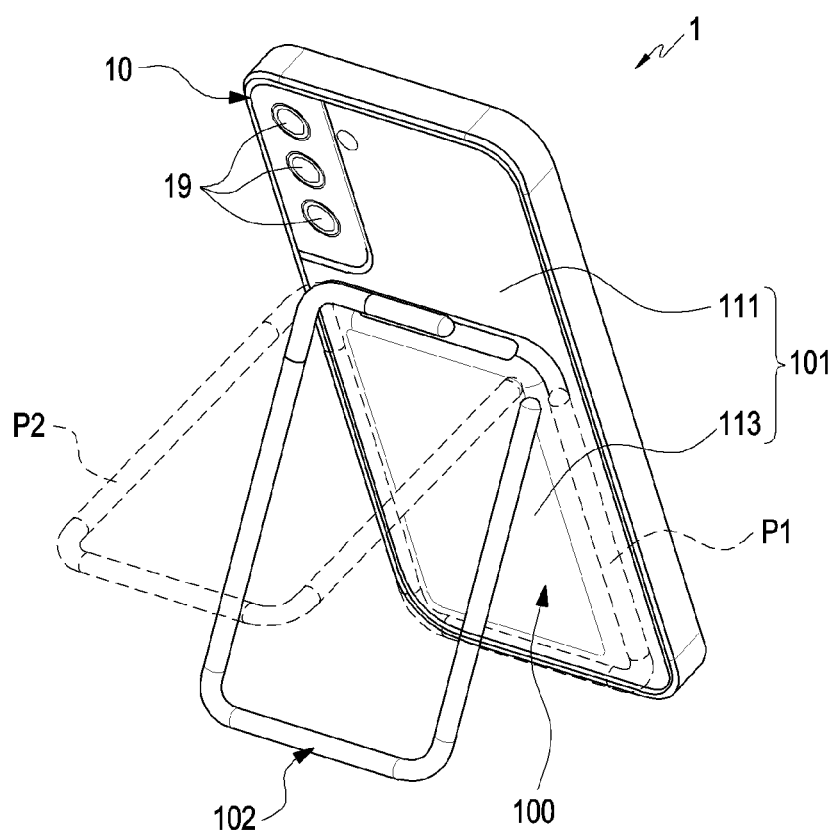
FIG. 12 is a diagram illustrating an electronic device mounted in a vertical direction using an accessory according to various embodiments of the disclosure.
Figure 13:
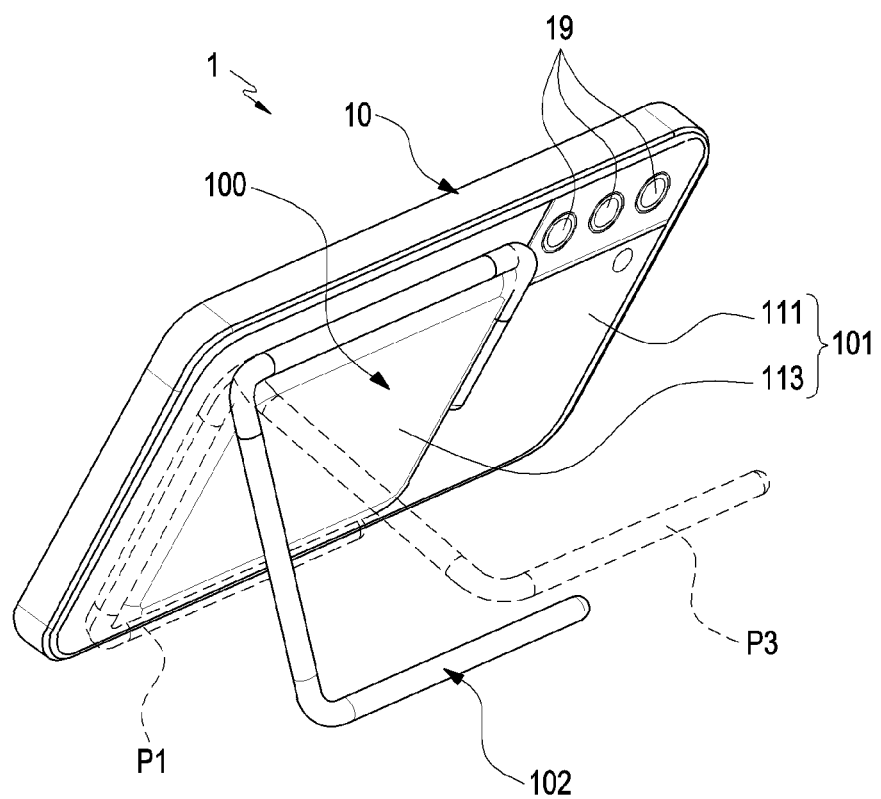
FIG. 13 is a diagram illustrating an electronic device mounted in a horizontal direction using an accessory according to various embodiments of the disclosure.
Figure 14:
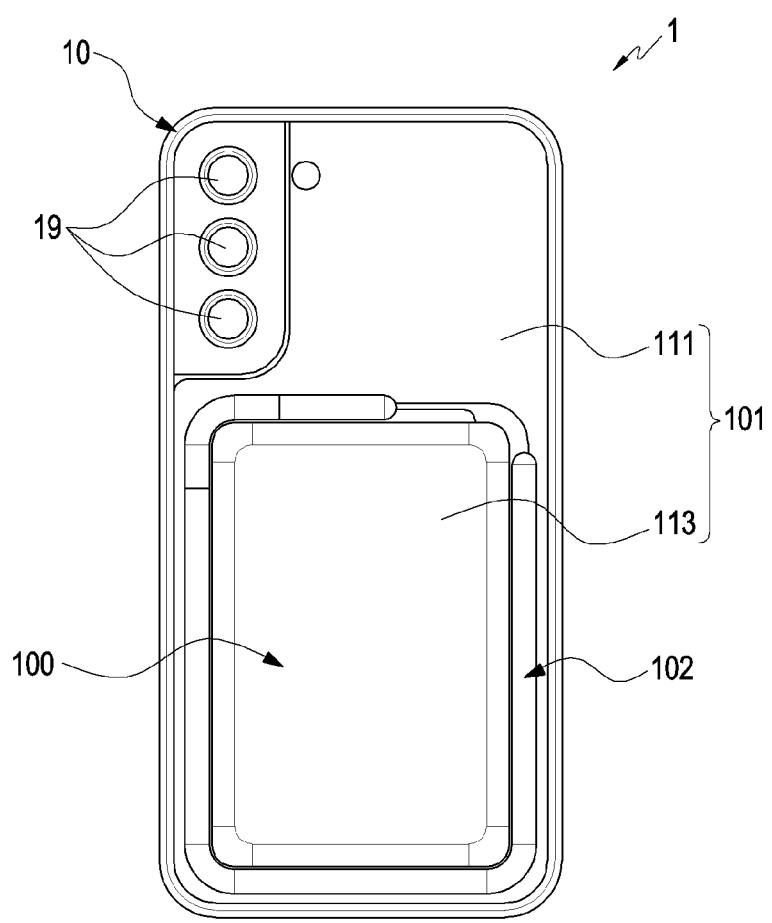
FIG. 14 is a diagram illustrating an accessory coupled with an electronic device (a body) according to various embodiments of the disclosure.

Referring to FIGS. 1 and 2, the accessory 100 may be configured as (or defined by) a part of an electronic device (e.g., an electronic device 1 of FIG. 12) or may be configured to be detachably attached to a body (e.g., a body 10 of FIGS. 7 and 8, and/or FIGS. 12, 13 and 14). For example, the accessory 100 may include a coupler 101 configured to be detachably attached to the body 10, and a support 102 rotatably coupled with the coupler 101. The support 102 may be rotatable, for example, between a first position (e.g., a state illustrated in FIG. 6 or a first position P1 of FIG. 7) at which the support 102 contacts or closely contacts one surface of the coupler 101 and a second position at which the support 102 is inclined to the one surface of the coupler 101. In an embodiment, the "second position" may be any of positions indicated by "P2-$n$" in FIG. 7 or "P3-$n$" in FIG. 8, or any of states illustrated in FIGS. 2, 12, and 13, where "n" is 1, 2 or 3. Depending on a rotation (or pivoting) position of the support 102 with respect to the coupler 101, the accessory 100 may position the electronic device 1 or the body 10 of the electronic device 1 to be inclined to a plane, e.g., a planar surface that supports the electronic device 1 or the body 10 of the electronic device 1, or may be used as a wall-mounted holder. For example, when the support 102 is at a position indicated by "P2-3" of FIG. 7 or "P3-3" of FIG. 8, the support 102 may function as a wall-mounted holder.

According to various embodiments, the coupler 101 may be configured to be coupled with at least one surface of the electronic device 1 or at least one surface of the body 10. For example, the coupler 101 may include a plate-shaped coupling member 111 corresponding to the one surface of the electronic device 1 or the body 10, and may be coupled with the electronic device 1 in one of various manners, e.g., an adhesive or adsorption manner. The accessory 100 is selectively coupled or decoupled with the electronic device 1 or the body 10 by a user. Even though the electronic device 1 or the body 10 is not coupled with the accessory 100, the electronic device 1 or the body 10 may perform functions loaded therein. When the accessory 100 is coupled with the electronic device 1 or the body 10, a function provided by the accessory 100 may be used to increase the use convenience or performance of the electronic device 1 or the body 10 or extend functions of the electronic device 1 or the body 10. The afore-mentioned "one surface of the coupler 101 coupled with the support 102" may be understood as substantially one surface of the coupling member 111.

According to various embodiments, as shown in FIGS. 1 and 2, the coupling member 111 may be shaped into a plate, but various embodiments of the disclosure are not limited thereto, and the coupler 101 may be a structure coupled with the electronic device 1 or the body 10 by means of a hook or a rib extending from an edge of the coupling member 111, surrounding side surfaces of the electronic device 1 or the body 10. In embodiments where the coupler 101 is a the structure coupled with the electronic device 1 or the body 10, surrounding the side surfaces of the electronic device 1 or the body 10, the coupler 101 may be easily coupled with the electronic device 1 or the body 10 even without including an adhesive structure or an adsorption structure.

According to various embodiments, the accessory 100 or the coupler 101 may include an opening area 117 defined at least in part by the coupling member 111. In an embodiment, the electronic device 1 or the body 10 may include a camera (e.g., a camera module 19 of FIGS. 12, 13 and 14) disposed on the surface with which the accessory 100 is coupled, or a speaker hole (not shown). For example, when the accessory 100 is coupled with the electronic device 1 or the body 10, the opening area 117 may disposed in correspondence with the camera or the speaker hole, to prevent an operating environment of the electronic device 1 or the body 10 from being disturbed.

According to various embodiments, the coupler 101 may further include a protrusion member 113 protruding from one surface of the coupling member 111. In various embodiments, the coupling member 111 may be disposed between the protrusion member 113 and the electronic device 1 or the body 10 in a state where the coupler 101 is coupled with the electronic device 1 or the body 10. The protrusion member 113 may be disposed, for example, in an area or space at least partially surrounded by the support 102 at the first position P1 (i.e., the first position P1 of FIG. 7). For example, the support 102 may be disposed, at the first position P1, to surround at least a part of side surface(s) of the protrusion member 113. In a certain embodiment, the side surface of the protrusion member 113 may be formed in the shape of a groove to receive at least a part of the support 102, such that the support 102 may be fastened, at the first position P1, with the side surface of the protrusion member 113. For example, the support 102 may be stably maintained in close contact with the coupler 101 in a portable state (i.e., a state where the support 102 is at the first position P1). As described later, various electrical/electronic components (e.g., an electrical/electronic component 419 of FIG. 11) may be accommodated or disposed in the protrusion member 113, and the accessory 100 may improve the electrical/electronic performance of the electronic device 1 or the body 10 or diversify functions of the electronic device 1 or the body 10 according to the electrical/electronic component accommodated in the protrusion member 113. In a certain embodiment, the protrusion member 113 may be substantially omitted. In such an embodiment, the support 102 may be directly coupled with one surface of the coupling member 111, and at the first position P1, come into close contact with the surface of the coupling member 111. In such an embodiment, the accessory 100 may improve the electrical/electronic performance of the electronic device 1 or the body 10 or diversify functions of the electronic device 1 or the body 10 even without the protrusion member 113 because various electrical/electronic components may be embedded in the coupling member 113.

According to various embodiments, in the portable state, the support 102 may be located at the first position P1, for example, in contact with one surface of the coupler 101, and selectively pivot with respect to the coupler 101 by the user, to hold the electronic device 1 or body 10 inclined to a plane. The configuration of the support 102 will be described with further reference to FIGS. 3 to 6.

Figure 3:
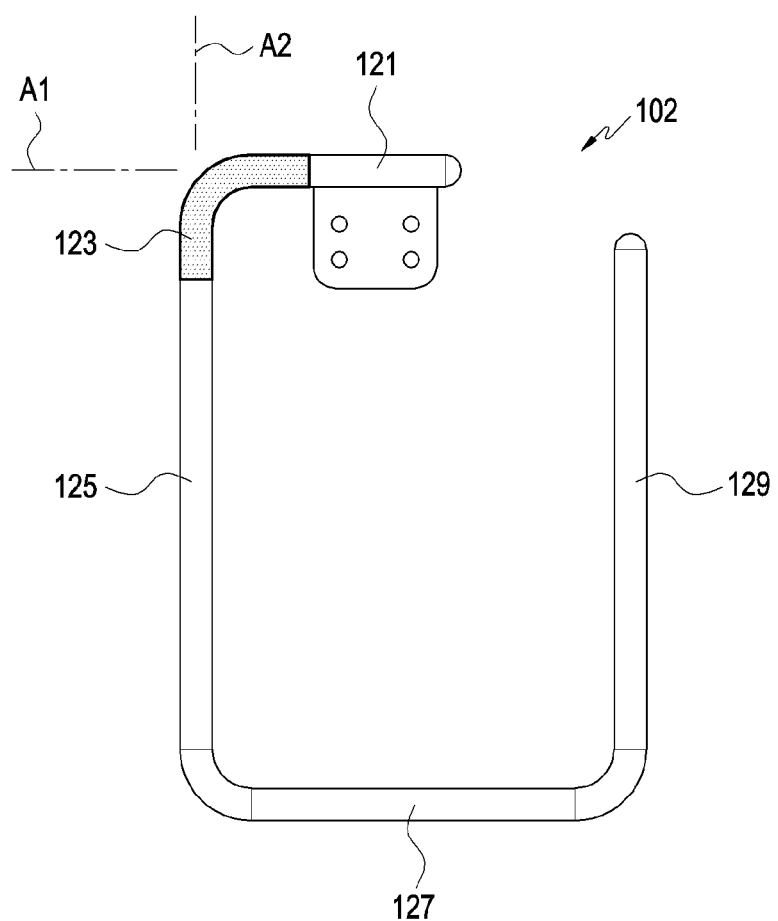
FIG. 3 is a plan view illustrating a support of an accessory according to various embodiments of the disclosure.
Figure 4:
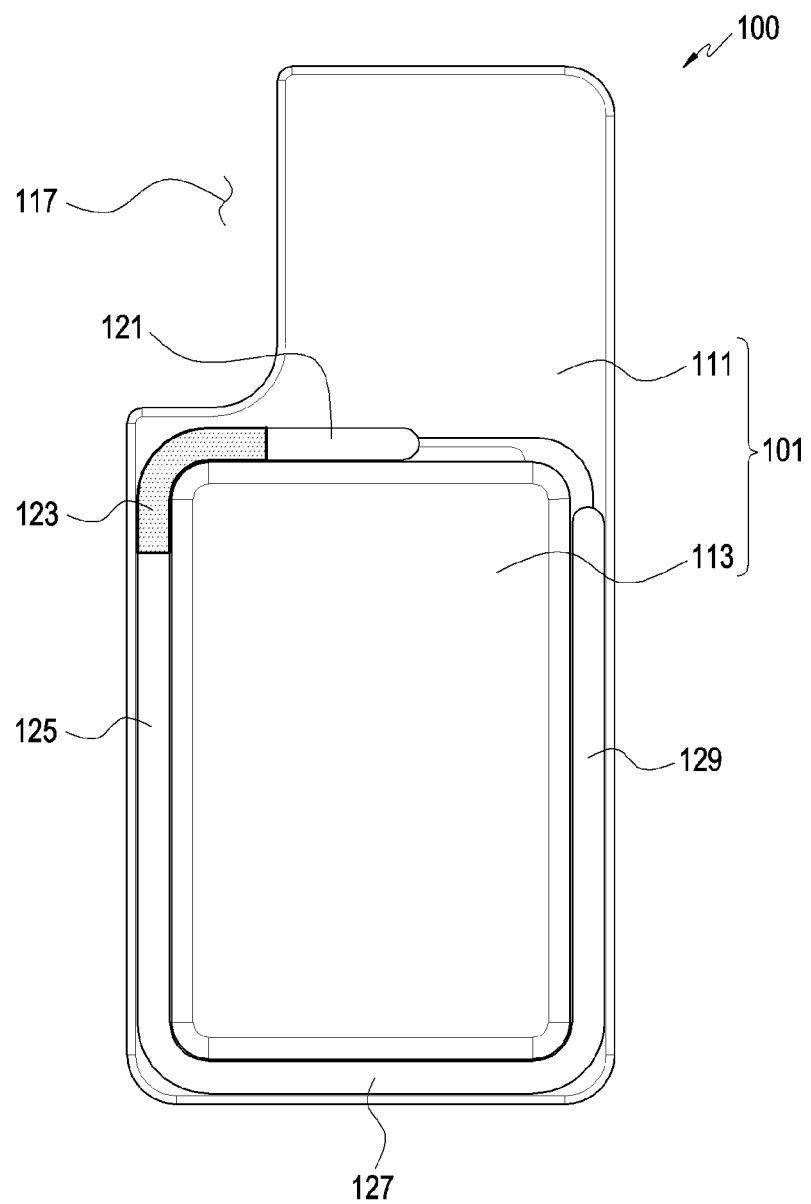
FIG. 4 is a plan view illustrating an accessory according to various embodiments of the disclosure.
Figure 5:
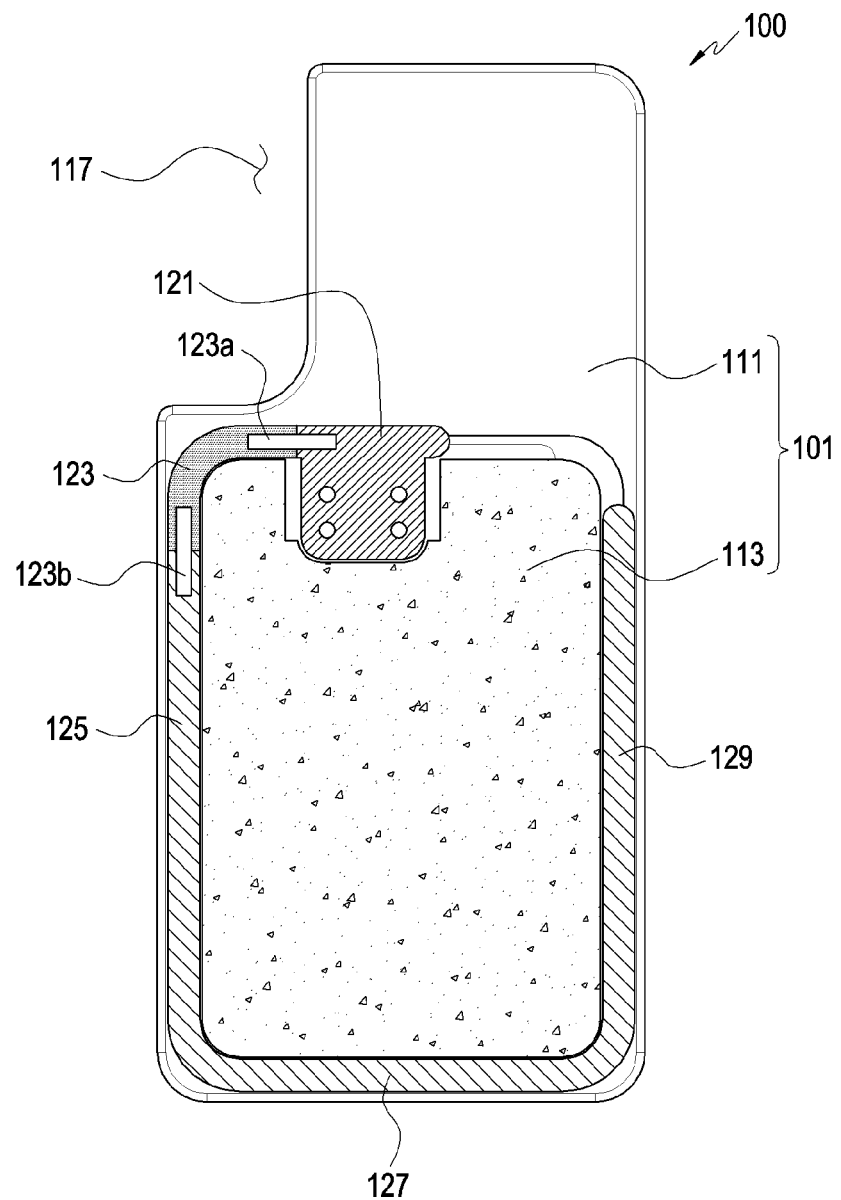
FIG. 5 is a cross-sectional plan view illustrating a part of an accessory according to various embodiments of the disclosure.

FIG. 3 is a plan view illustrating the support 102 of the accessory 100 according to various embodiments of the disclosure. FIG. 4 is a plan view illustrating the accessory 100 according to various embodiments of the disclosure. FIG. 5 is a cross-sectional plan view illustrating a part of the accessory 100 according to various embodiments of the disclosure. FIG. 6 is a side view illustrating the accessory 100 according to various embodiments of the disclosure.

Further referring to FIGS. 3 to 6, an embodiment of the support 102 may include a fixing member 121, a hinge member 123, and/or a plurality of support members 125, 127, and 129. The fixing member 121 is a component coupled with or fixed to the coupler 101, and may be, for example, at least partially accommodated in the protrusion member 113. In an embodiment, a first slot 115 (shown in FIG. 1) may be provided on one side surface of the protrusion member 113, and the fixing member 121 may be at least partially accommodated in the first slot 115. According to another embodiment, the fixing member 121 may be substantially fixed to the first slot 115 or the protrusion member 113 by a snap-fit structure or a magnet, and separated from the first slot 115 when a force equal to or greater than a specified magnitude is applied thereto. In a certain embodiment having a structure in which the coupler 101 does not include the protrusion member 113, the fixing member 121 may be directly coupled with one surface of the coupling member 111. For example, the fixing member 121 may be substantially fastened with the coupling member 111 by a snap-fit structure or a magnet, while facing at least a part of one surface of the coupling member 111.

In the following detailed description, when it is said that A 'rotates (or is rotating)', this may be understood as an operation in which A rotates around a rotation axis disposed to directly intersect with A or substantially pass through A, for example, as a concept similar to the rotation of the Earth. In the following detailed description, when it is said that A 'revolves or revolves around', this may be understood as an operation in which A moves along a curved or circular trajectory around a rotation axis or a pivoting axis at a position spaced apart from the rotation axis or the pivoting axis, for example, as a concept similar to the revolution of the Earth around the sun. In the following detailed description, when it is said that A "pivots", this may be understood as an operation in which A being in the form of a cantilever such as a bar or a rod rotates round a rotation axis or a pivoting axis, while obliquely or perpendicularly intersecting with the rotation axis or the pivoting axis at one end thereof or at a point adjacent to one end thereof. For example, the pivoting may be understood as an operation in which a cantilever rotates around the sun, on the assumption that the cantilever connects the earth to the sun.

According to various embodiments, the hinge member 123 may be coupled with the fixing member 121, and configured to rotate around a first rotation axis A1 with respect to the fixing member 121. In an embodiment, as shown in FIG. 5, the hinge member 123 may be coupled with the fixing member 121 through a first hinge module 123a and rotate around the first rotation axis A1 with respect to the fixing member 121 or the first hinge module 123a. In an embodiment, as the first hinge module 123a provides a static friction force of a specified magnitude, while allowing the hinge member 123 to rotate freely with respect to the fixing member 121, the support 102 (e.g., a first support member 125 among the support members 125, 127, and 129) may be maintained in a stationary state, inclined to the coupler 101.

According to various embodiments, among the support members 125, 127, and 129, the first support member 125 may be shaped into a bar or rod extending in one direction (e.g., the direction of a second rotation axis A2), have one end coupled with the hinge member 123, and be configured to pivot around the first rotation axis A1 along with rotation of the hinge member 123 around the first rotation axis A1. In an embodiment, the first support member 125 may be substantially disposed on the second rotation axis A2, extending in the direction of the second rotation axis A2, and configured to rotate around the second rotation axis A2 with respect to the hinge member 123. In a certain embodiment, as shown in FIG. 5, the first support member 125 may be coupled with the hinge member 123 through a second hinge module 123b, and rotate around the second rotation axis A2 with respect to the hinge member 123 or the second hinge module 123b. As the second hinge module 123b provides a static friction force of a specified magnitude, while allowing the first support member 125 to freely rotate with respect to the hinge member 123, the support 102 (e.g., a second support member 127 described later as one of the support members 125, 127, and 129) may be maintained in the stationary state, inclined to the coupler 101.

According to various embodiments, among the support members 125, 127, and 129, the second support member 127 may be shaped into a bar or rod extending in one direction (e.g., a direction of the first rotation axis A1) from one end of the first support member, have one end coupled to the first support member 125, and be configured to pivot around the second rotation axis A2 along with rotation of the first support member 125 around the second rotation axis A2. In an embodiment, the second support member 127 may be disposed at a position substantially spaced apart from the first rotation axis A1 by the length of the first support member 125 in a direction of the second rotation axis A2. For example, the second support member 127 may be configured to revolve around the first rotation axis A1 along a curved or circular trajectory at the position spaced apart from the first rotation axis A1, along with rotation of the hinge member 123 around the first rotation axis A1 or along with pivoting of the first support member 125 around the first rotation axis A1.

According to various embodiments, the accessory 100 may further include a third support member 129 provided as another one of the support members 125, 127 and 129. The third support member 129 may extend, for example, from an end of the second support member 127 and be disposed parallel to or substantially parallel to the first support member 125. For example, the third support member 129 may extend in a direction substantially perpendicular to the second support member 127. In such an embodiment, where the third support member 129 is included, the support 102 (e.g., the support members 125, 127 and 129) may be substantially 'U'-shaped. In an embodiment, the third support member 129 may be configured to revolve around the first rotation axis A1, when the hinge member 123 rotates. In another embodiment, the third support member 129 may be configured to revolve around the second rotation axis A2, when the first support member 125 rotates or when the second support member 127 pivots around the second rotation axis A2.

According to various embodiments, the first rotation axis A1 and the second rotation axis A2 may intersect with each other substantially perpendicularly, and the second support member 127 may extend in a direction perpendicular to the first support member 125 or the second rotation axis A2. At the first position P1, the first support member 125 and/or the second support member 127 may be located substantially in contact with one surface of the coupler 101 or in contact with different parts of the side surfaces of the protrusion member 113. At the first position P1, the second support member 125 may be disposed substantially parallel to the first rotation axis A1. In a certain embodiment, the third support member 129 may extend in a direction parallel to the first support member 125 or the second rotation axis A2 and be disposed parallel to the first support member 125. At the first position P1, the third support member 129 may be located substantially in contact with one surface of the coupler 101 or in contact with another part of the side surfaces of the protrusion member 113.

FIG. 7 is a diagram illustrating rotation of a part of the support 102 around the first rotation axis A1 in the accessory 100 according to various embodiments of the disclosure.

In FIG. 7, for example, the hinge member 123 is shown as rotating around the first rotation axis A1 with the support 102 (e.g., the first support member 125 and/or the second support member 127) without rotating or pivoting around the second rotation axis A2, from a state in which the support 102 is disposed at the first position P1. As the hinge member 123 rotates around the first rotation axis A1, the first support member 125 may pivot around the first rotation axis A1, and the second support member 127 and the third support member 129 may revolve around the first rotation axis A1. In a certain embodiment, where an end of the third support member 129 is located substantially on the first rotation axis A1, when the hinge member 123 rotates around the first rotation axis A1, the third support member 129 may be viewed as pivoting around the first rotation axis A1.

Referring to FIG. 7, 'P1' may denote a first position at which the support 102 is in contact with the coupler 101, and 'P2-n' may denote various second positions at which the support 102 (e.g., the first support member 125) may be located by pivoting with respect to the coupler 101. As the hinge member 123 rotates around the first rotation axis A1, the support 102 (e.g., the first support member 125) may freely pivot around the first rotation axis A1 within an angle range of approximately 180 degrees with respect to the body 10 of the electronic device 1 or the coupler 101. In a certain embodiment, a static friction force between the hinge member 123 and the fixing member 121 or a static friction force between the hinge member 123 (a first hinge module (e.g., the first hinge module 123a of FIG. 5)) and the fixing member 121 may maintain the support 102 in the stationary state with respect to the coupler 101.

According to various embodiments, the accessory 100 may hold the body 10 inclined to a plane, with an edge of one side (e.g., a lower end of FIG. 4) of the coupler 101 and the second support member 127 in contact with the plane. For example, the operation illustrated in FIG. 7 may implement a state in which the body 10 is mounted vertically elongated with respect to the plane. The user may rotate or pivot the support 102 around the first rotation axis A1 with respect to the coupler 101 to adjust an inclination angle of the body 10 with respect to the plane, so that the user may comfortably view the body 10 (e.g., a display). In another embodiment, when the support 102 is at a position indicated by "P2-3", the body 10 and/or the accessory 100 may be used as a wall mount. For example, the electronic device 1 may be used in a state in which the body 10 and/or the accessory 100 hangs on a wall of an indoor space or a hook provided inside a vehicle. In an actual use environment, for example, when used inside a moving vehicle, the body 10 and/or the accessory 100 may be stably mounted or fixed by fastening the support 102 or the coupler 101 using a plurality of hooks or holders.

FIG. 8 is a diagram illustrating rotation of another part of the support 102 around the second rotation axis A2 in the accessory 100 according to various embodiments of the disclosure.

Referring to FIG. 8, the first support member 125 is shown as rotating around the second rotation axis A2 with the support 102 (e.g., the hinge member 123 and/or the first support member 125) without rotating or pivoting around the first rotation axis A1, from the state in which the support 102 is disposed at the first position P1. In FIG. 8, 'P1' may denote a position at which the support 102 is in contact with the coupler 101, and 'P3-n' may denote various second positions at which the support 102 (e.g., the second support member 125) may be located by pivoting with respect to the coupler 101. As the first member 125 rotates around the second rotation axis A2, the support 102 (e.g., the second support member 127) may freely pivot around the second rotation axis A2 within an angle range of approximately 180 degrees with respect to the body 10 of the electronic device 1 or the coupler 101. In a certain embodiment, a static friction force between the first support member 125 and the second support member 127, or a static friction force of the hinge member 123 (a second hinge module (e.g., the second hinge module 123*b* of FIG. 5) and the first support member 125 may maintain the support 102 (e.g., the second support member 127) in the stationary state with respect to the coupler 101.

According to various embodiments, the accessory 100 may hold the body 10 inclined to a plane, with an edge of another side of the coupler 101 (e.g., a right part of the coupler 101 adjacent to the third support member 129 at the first position P1 of FIG. 4) and the second support member 127 in contact with the plane. For example, the operation illustrated in FIG. 8 may implement a state in which the body 10 is mounted horizontally elongated with respect to the plane. The user may rotate or pivot the support 102 around the second rotation axis A2 with respect to the coupler 101 to adjust an inclination angle of the body 10 with respect to the plane, so that the user may comfortably view the body 10 (e.g., the display). Since this use example is similar to the embodiment of FIG. 7, a further detailed description will be avoided.

In the following detailed description, the same reference numerals are given or omitted for the same components as those of the above-described embodiment or components that can be easily understood from the above-described embodiment in the drawings, and any repetitive detailed description thereof may also be omitted.

Figure 9:
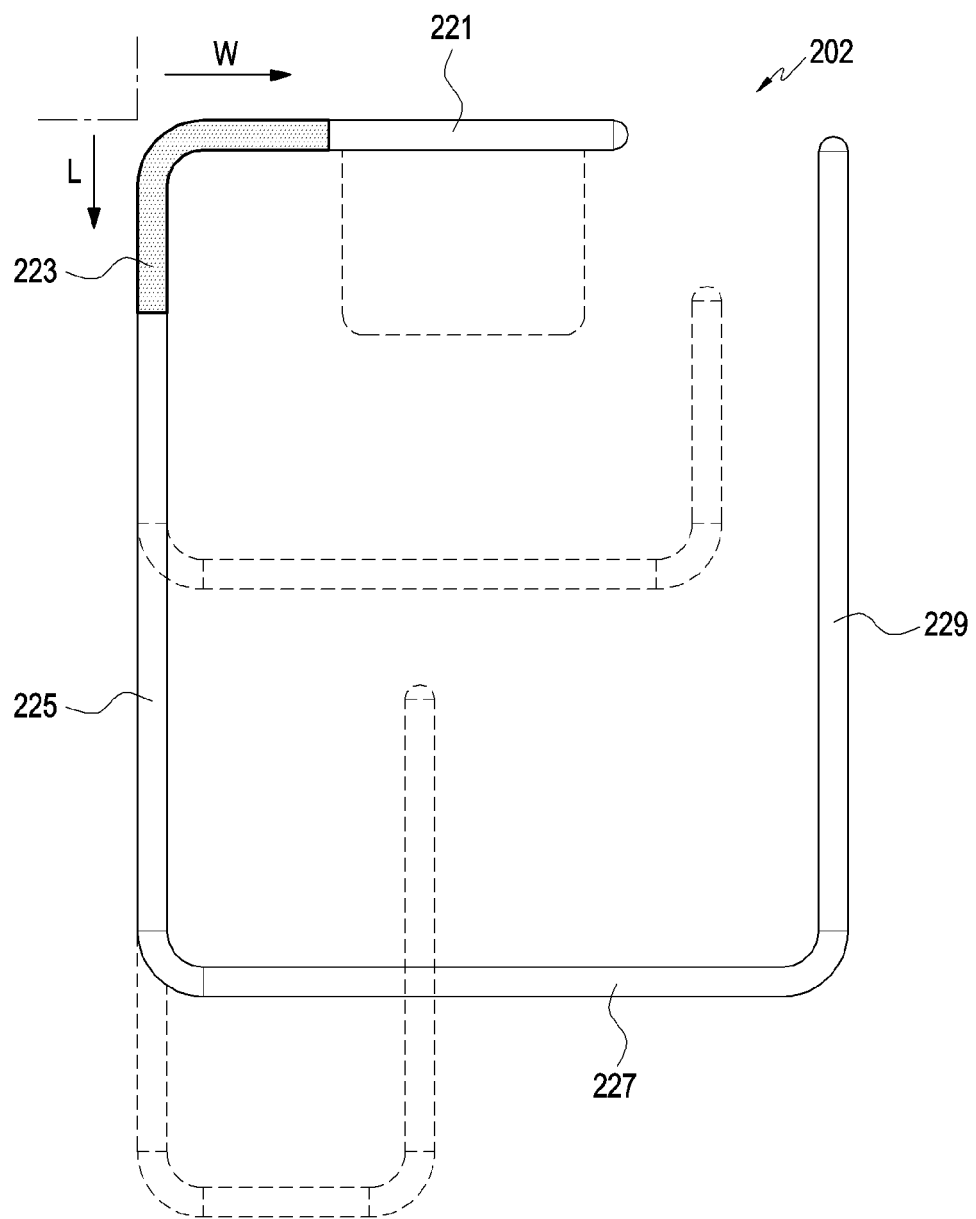
FIG. 9 is a plan view illustrating a support in an accessory according to various alternative embodiments of the disclosure.

FIG. 9 is a plan view illustrating a support 202 (e.g., the support 102 of FIGS. 1 to 8) in an accessory (e.g., accessory 100 of FIGS. 1 to 8) according to various alternative embodiments of the disclosure.

Referring to FIG. 9, an embodiment of the accessory 100 may be selectively coupled with one of electronic devices of different shapes and sizes, and the length L or width W of the support 202 may be adjusted to correspond to the shape or size of the electronic device. For example, at least one of a first support member 225, a second support member 227, and/or a third support member 229 may be configured to be expandable or contractible to adjust the length L or width W of the support 202. For example, while not shown, at least one of the first support member 225, the second support member 227, and/or the third support member 229 may include a first tube extending in a direction of the length L or the width W, and at least one second tube accommodated in the first tube. In an embodiment, the second tube may be in the shape of a rod extending in the direction in which the first tube extends, and may be configured to be accommodated in the first tube or gradually drawn out from one end of the first tube, by moving in the extension direction of the first tube. For example, the length L or width W of the support 202 may be adjusted to suit the shape and size of the electronic device 1 or the body 10.

Figure 10:
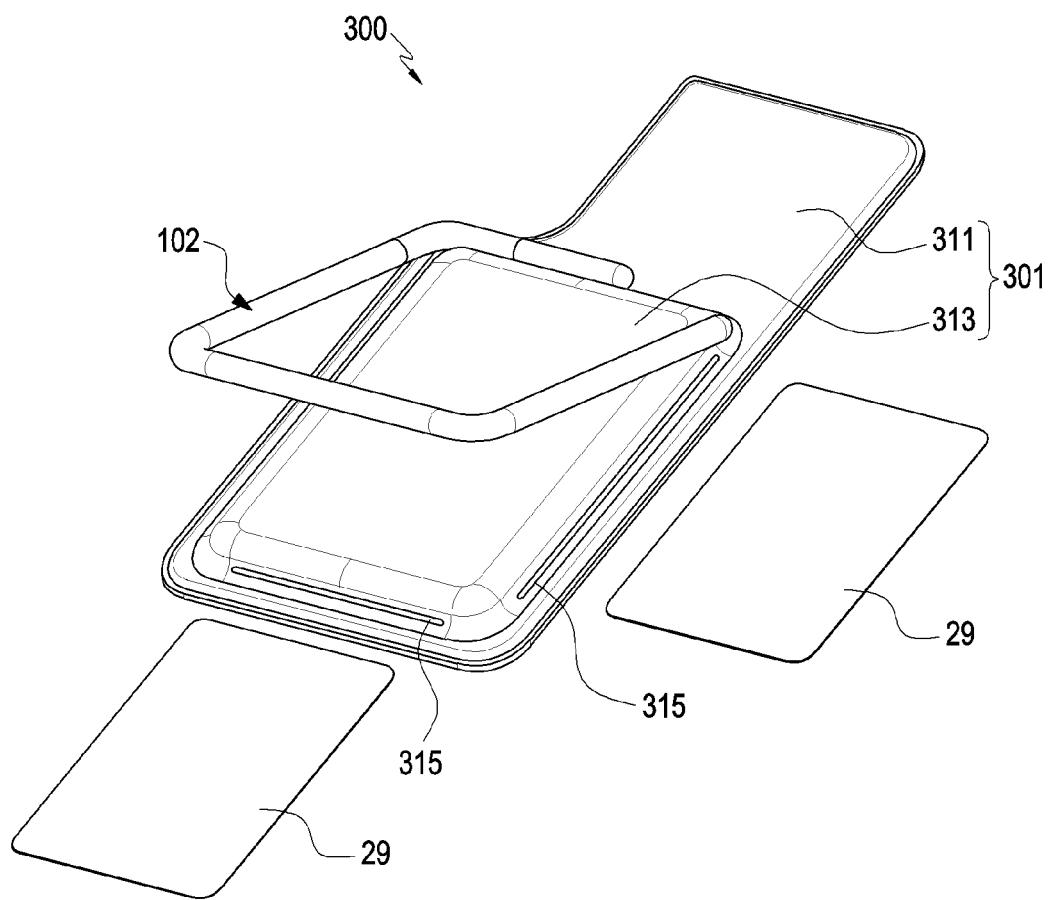
FIG. 10 is a perspective view illustrating an accessory according to various embodiments of the disclosure.
Figure 11:
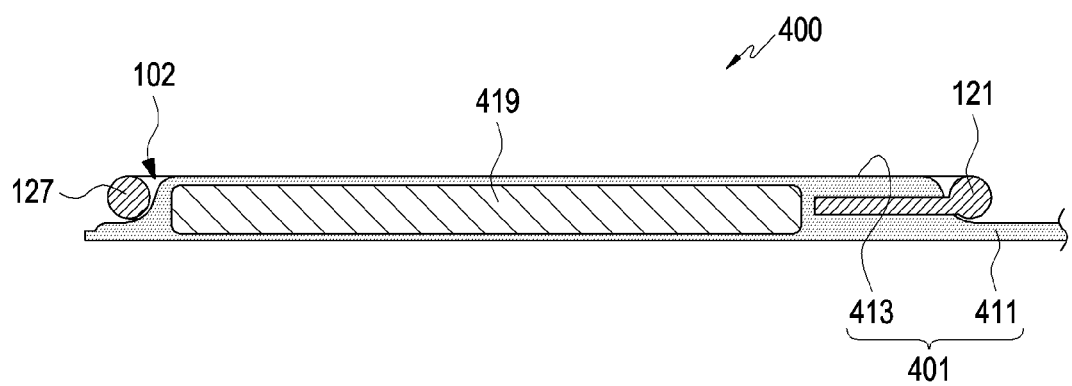
FIG. 11 is a side cross-sectional view illustrating an accessory according to various embodiments of the disclosure.

FIG. 10 is a perspective view illustrating an accessory (e.g., the accessory 100 of FIGS. 1 to 8) according to various embodiments of the disclosure. FIG. 11 is a cross-sectional side view illustrating the accessory (e.g., the accessory 100 of FIGS. 1 to 8) according to various embodiments of the disclosure.

Referring to FIGS. 10 and 11, in embodiments where accessories 300 and 400 or couplers 301 and 401 include protrusion members 313 and 413, the protrusion members 313 and 413 may be used as a space for keeping a belonging 29 therein as shown in FIG. 10 and a space for arranging an electric/electronic component 419 therein as shown in FIG. 11. The belonging 29 may include, for example, a credit card or an identification (ID) card, and at least one second slot 315 may be provided, which is defined or formed on another side surface of the protrusion member 313 (e.g., a side surface other than the side surface with which the fixing member 121 of FIG. 1 is coupled). In an embodiment, as the support 102 pivots, the at least one second slot 315 may be selectively opened or closed by at least one of the first support member 125, the second support member 127, and/or the third support member 129. For example, at the first position P1 of FIG. 7 or FIG. 8, the at least one second slot 315 may be substantially concealed or closed by one of the second support member 127 and/or the third support member 129. When the support 102 moves from the first position P1 by pivoting, the at least one second slot 315 may be at least partially opened or exposed to the outside.

According to various embodiments, the second slot 315 may have a shape corresponding to the thickness, width, or length of a belonging, for example. In a certain embodiment, the electrical/electronic component 419 disposed inside the protrusion member 413 may include at least one of a battery, a near field communication (NFC) antenna, a wireless power transmission/reception antenna, a storage medium reader, and/or an integrated circuit (IC) chip reader. The term "IC chip reader" may cover a reader capable of reading an identification module mounted on a credit card or an ID card, and may include a magnetic secure transmission-based reader according to an embodiment. In another embodiment, when including an NFC antenna or a wireless power transmission/reception antenna, the accessory 400 may include a communication module or a power management module to perform communication or power transmission/reception with the electronic device 1 or the body 10 in a wireless manner. In another embodiment, when the accessory 400 is coupled to the electronic device 1 or the body 10 in a wired manner, while being combined with the electronic device 1 or the body 10, the accessory 400 may further include a connector as the electrical/electronic component 419 accommodated in the protrusion member 413.

According to various embodiments, in the accessory (e.g., the accessories 100, 300, and 400 of FIGS. 1 to 11), the single support 102 may be compatible with a plurality of couplers 101, 301, and 401. For example, various types of couplers 101, 301, and 401 with different storage functions or embedded electric/electronic components may be provided, and the user may easily extend or change a function of the electronic device 1 or the body 10 by replacing the couplers 101, 301, and 401. In an embodiment, in an environment where a simple POS terminal is desired to be carried and used, the user may couple a first accessory (e.g., one of the accessories 100, 300, and 400 of FIGS. 1 to 11) in which the IC chip reader and the NFC function are integrated, with the body 10. In another embodiment, the use of the IC chip reader and the NFC function may increase the power consumption of the electronic device 1 or the body 10. In this case, the user may carry a second accessory (e.g., another one of the accessories 100, 300, and 400 of FIGS. 1 to 11) in which a battery and a wireless power transmission function are integrated, together with the first accessory.

FIG. 12 is a diagram illustrating the electronic device 1 vertically mounted using the accessory 100 according to various embodiments of the disclosure. FIG. 13 is a diagram illustrating the electronic device 1 horizontally mounted using the accessory 100 according to various embodiments of the disclosure. FIG. 14 is a diagram illustrating the accessory 100 coupled with the electronic device 1 (e.g., the body 10) according to various embodiments of the disclosure.

Referring to FIGS. 12, 13 and 14, an embodiment of the electronic device 1 may include the body 10, and the accessory 100 (e.g., the accessories 100, 300, and 400 of FIGS. 1 to 11) detachably coupled with the body 10. The accessory 100, for example, the coupler 101 may be coupled with one surface (e.g., the rear surface) of the body 10, facing the surface of the body 10. In an embodiment, the electronic device 1 or the body 10 may include camera module(s) 19 disposed on one surface of the body 10. In an embodiment, as described above, the accessory 100 may include an opening area (e.g., the opening area 117 of FIG. 4) at least partially defined by the coupling member 111, such that the coupling of the accessory 100 with the one surface of the body 10 may not interfere with an optical path of the camera module(s) 19. In another embodiment, where a speaker hole (not shown) is provided on one surface of the body 10, the accessory 100 or the coupler 101 may include an additional hole defined through the coupling member 111, and the additional hole may be aligned with the speaker hole.

FIG. 12 illustrates the electronic device 1 in a state implemented by, for example, the operation of pivoting the support 102 (e.g., the first support member 125 of FIG. 2) around the first rotation axis A1, illustrated in FIG. 7. In this state, the body 10 may be mounted vertically elongated with respect to the plane. According to some embodiments, a rotation or pivoting angle range of the support 102 (e.g., the first support member 125) may be limited to a position at which the support 102 is located by pivoting from the first position P1 by about 90 degrees, for example, a position indicated by "P2". FIG. 13 illustrates the electronic device 1 in another state implemented by, for example, the operation of pivoting the support 102 (e.g., the second support member 125 of FIG. 2) around the second rotation axis A2, illustrated in FIG. 8. In this state, the body 10 may be mounted horizontally elongated with respect to the plane. According to some embodiments, a rotation or pivoting angle range of the support 102 (e.g., the second support member 127) may be limited to a position at which the support 102 is located by pivoting from the first position P1 by about 90 degrees, for example, a position indicated by "P3".

According to various embodiments, the angle range in which the first support member 125 pivots around the first rotation axis A1 or the angle range in which the second support member 127 pivots around the second rotation axis A2 may vary. For example, as described above, when an environment in which the electronic device 1 may be used as a wall mount by using the accessory 100 is to be provided, the first support member 125 or the second support member 127 may pivot in an angle range of up to about 180 degrees from the first position P1. For example, the pivoting angle range of the support 102 may be appropriately selected in consideration of the purpose or actual use environment of the accessory 100.

As described above, according to various embodiments of the disclosure, an accessory (e.g., the accessory 100, 300 or 400 of FIG. 1, FIG. 2, FIG. 10, or FIG. 11) for an electronic device (e.g., the electronic device 1 of FIGS. 12, 13 and 14) and/or an electronic device including the accessory may include a coupler (e.g., the coupler 101 of FIG. 1 or FIG. 2) which is be detachably attached to the electronic device, and a support (e.g., the support 102 of FIG. 1 or FIG. 2) coupled with the coupler to be pivotable between a first position (e.g., the first position P1 of FIG. 4, FIG. 7, FIG. 8, FIG. 12, and/or FIG. 13) at which the support contacts one surface of the coupler and a second position at which the support is inclined to the one surface of the coupler. The support may include a fixing member (e.g., the fixing member 121 of FIG. 1 or FIG. 2) coupled with the coupler, a hinge member (e.g., the hinge member 123 of FIG. 1 or FIG. 2) coupled with the fixing member and configured to rotate around a first rotation axis (e.g., the first rotation axis A1 of FIG. 1 or FIG. 2) with respect to the fixing member, a first support member (e.g., the first support member 125 of FIG. 1 or FIG. 2) coupled with the hinge member, and configured to pivot around the first rotation axis along with a rotation of the hinge member, and rotate around a second rotation axis intersecting with the first rotation axis with respect to the hinge member, and a second support member (e.g., the second support member 127 of FIG. 1 or FIG. 2) extending from an end of the first support member, and configured to revolve around the first rotation axis along with a pivoting of the first support member, and pivot around the second rotation axis along with a rotation of the first support member.

According to various embodiments, the first rotation axis and the second rotation axis may intersect with each other perpendicularly, and the first support member and the second support member may extend in directions perpendicular to each other.

According to various embodiments, the support may further include a third support member (e.g., the third support member 129 of FIG. 1 or FIG. 2) extending from an end of the second support member and disposed parallel to the first support member. According to various embodiments, the third support member may be configured to revolve around the first rotation axis along with the rotation of the hinge member around the first rotation axis, and revolve around the second rotation axis along with the rotation of the first support member around the second rotation axis.

According to various embodiments, at least one of the first support member, the second support member, or the third support member may be expandable or contractible in an extension direction or a longitudinal direction of the at least one support member (e.g., refer to FIG. 9).

According to various embodiments, the first support member may include a rod extending along a direction of the second rotation axis.

According to various embodiments, at the first position, the second support member may include a rod disposed parallel to the first rotation axis.

According to various embodiments, the coupler may include a coupling member (e.g., the coupling member 111 of FIG. 1 or FIG. 2) coupled with at least a part of one surface of the electronic device, facing the at least the part of the one surface of the electronic device, a protrusion member (e.g., the protrusion member 113 of FIG. 1 or FIG.

2) protruding from one surface of the coupling member, and a first slot (e.g., the first slot 115 of FIG. 1) defined on a first side surface among side surfaces of the protrusion member. The fixing member may be coupled with the coupler by being at least partially accommodated in the first slot.

According to various embodiments, at the first position, at least one of the hinge member, the first support member, or the second support member may be disposed to at least partially surround a side surface of the protrusion member.

According to various embodiments, the coupler may further include a second slot (e.g., the second slot 315 of FIG. 10) defined on a side surface other than the first side surface among the side surfaces of the protrusion member, and the second slot may be opened or closed by one of the first support member and the second support member, along with a pivoting of the support.

According to various embodiments, the support may further include a third support member extending from an end of the second support member and disposed parallel to the first support member, and the third support member may revolve around the first rotation axis along with the rotation of the hinge member around the first rotation axis, and revolve around the second rotation axis along with the rotation of the first support member around the second rotation axis.

According to various embodiments, the coupler may further include a second slot defined on a side surface other than the first side surface among the side surfaces of the protrusion member, and the second slot may be opened or closed by one of the first support member, the second support member, and the third support member, along with the rotation of the support.

According to various embodiments, the coupler may further include at least one of a battery accommodated in the protrusion member, an NFC antenna, a wireless power transmission/reception antenna, a storage medium reader, or an IC chip reader (e.g., at least one as the electrical/electronic component 419 of FIG. 11).

According to various embodiments of the disclosure, an electronic device (e.g., the electronic device 1 of FIGS. 12, 13 and 140) may include a body (e.g., the body 10 of FIG. 7, FIG. 8, and/or FIGS. 12, 13 and 14), and an accessory (e.g., the accessory 100, 300 or 400 of FIG. 1, FIG. 2, FIG. 10, or FIG. 11) detachably attachable to the body. The accessory may include a coupler (e.g., the coupler 101 of FIG. 1 or FIG. 2) detachably attachable to at least one surface of the body, and a support (e.g., the support 102 of FIG. 1 or FIG. 2) coupled with the coupler to be pivotable between a first position (e.g., the first position P1 of FIG. 4, FIG. 7, FIG. 8, FIG. 12, and/or FIG. 13) at which the support contacts one surface of the coupler and a second position at which the support is inclined to the one surface of the coupler. The support may include a fixing member (e.g., the fixing member 121 of FIG. 1 or FIG. 2) coupled with the coupler, a hinge member (e.g., the hinge member 123 of FIG. 1 or FIG. 2) coupled with the fixing member and configured to rotate around a first rotation axis (e.g., the first rotation axis A1 of FIG. 1 or FIG. 2) with respect to the fixing member, a first support member (e.g., the first support member 124 of FIG. 1 or FIG. 2) coupled with the hinge member, and configured to pivot around the first rotation axis along with rotation of the hinge member, and rotate around a second rotation axis (e.g., the second rotation axis A2 of FIG. 1 or FIG. 2) intersecting with the first rotation axis with respect to the hinge member, and a second support member (e.g., the second support member 127 of FIG. 1 or FIG. 2) extending from an end of the first support member, and configured to revolve around the first rotation axis along with the pivoting of the first support member, and pivot around the second rotation axis along with rotation of the first support member.

According to various embodiments, the electronic device may further include at least one camera module (e.g., the camera module(s) 19 of FIGS. 12 and 13) disposed on one surface of the body, and an opening area (e.g., the opening area 117 of FIG. 12) defined by the coupler, and when the coupler is coupled with the body, disposed in correspondence with an area in which the camera module is disposed.

According to various embodiments, the body may be configured to perform NFC or wireless power transmission/reception with the accessory.

According to various embodiments, the coupler may include a coupling member (e.g., the coupling member 111 of FIG. 1 or FIG. 2) configured to be coupled with at least a part of one surface of the body, facing the at least the part of the one surface of the body, a protrusion member (e.g., the protrusion member 113 of FIG. 1 or FIG. 2) protruding from one surface of the coupling member, and a first slot (e.g., the first slot 115 of FIG. 1) formed on a first side surface among side surfaces of the protrusion member. The fixing member may be configured to be coupled with the coupler by being at least partially accommodated in the first slot.

According to various embodiments, the coupler may further include at least one second slot (e.g., the second slot 315 of FIG. 10) formed on a side surface other than the first side surface among the side surfaces of the protrusion member, and the at least one second slot may be configured to be opened or closed by one of the first support member and the second support member, along with pivoting of the support.

According to various embodiments, the coupler may further include at least one of a battery accommodated in the protrusion member, an NFC antenna, a wireless power transmission/reception antenna, a storage medium reader, or an IC chip reader (e.g., at least one as the electrical/electronic component 419 of FIG. 11).

According to various embodiments, the support may further include a third support member (e.g., the third support member 129 of FIG. 1 or FIG. 2) extending from an end of the second support member and disposed parallel to the first support member, and the third support member may revolve around the first rotation axis along with the rotation of the hinge member around the first rotation axis, and revolve around the second rotation axis along with the rotation of the first support member around the second rotation axis.

While the disclosure has been described with reference to various embodiments, it is to be understood that the various embodiments are illustrative, not limiting the disclosure. It will be apparent to those skilled in the art that various changes can be made in form and detail without departing from the scope of the disclosure, including the appended claims and their equivalents. For example, while 'second position', 'third position', 'position indicated by P2-$n$', and 'position indicated by P3-$n$' are used as positions to which a support pivots in the above-described embodiments, these expressions simply indicate exemplary angular positions to which the support is pivotable from a "first position". According to some embodiments, these positions may be understood as "any position different from the first position", and "any position different from the first position" may be understood as the "second position" or the "third position".

What is claimed is:

1. An accessory for an electronic device, comprising:
a coupler detachably attachable to the electronic device; and
a support coupled with the coupler to be pivotable between a first position at which the support contacts one surface of the coupler and a second position at which the support is inclined to the one surface of the coupler,
wherein the support comprises:
a fixing member coupled with the coupler;
a hinge member coupled with the fixing member, wherein the hinge member rotates around a first rotation axis with respect to the fixing member;
a first support member coupled with the hinge member, wherein the first support member pivots around the first rotation axis along with a rotation of the hinge member, and rotates around a second rotation axis intersecting with the first rotation axis with respect to the hinge member; and
a second support member extending from an end of the first support member, wherein the second support member revolves around the first rotation axis along with a pivoting of the first support member, and pivots around the second rotation axis along with a rotation of the first support member.

2. The accessory of claim 1, wherein
the first rotation axis and the second rotation axis intersect with each other perpendicularly, and
the first support member and the second support member extend in directions perpendicular to each other, respectively.

3. The accessory of claim 1, wherein the support further comprises a third support member extending from an end of the second support member and disposed parallel to the first support member.

4. The accessory of claim 3, wherein the third support member revolves around the first rotation axis along with the rotation of the hinge member around the first rotation axis, and revolves around the second rotation axis along with the rotation of the first support member around the second rotation axis.

5. The accessory of claim 3, wherein at least one of the first support member, the second support member, or the third support member is expandable or contractible in an extension direction or a longitudinal direction thereof.

6. The accessory of claim 1, wherein the first support member includes a rod extending along a direction of the second rotation axis.

7. The accessory of claim 1, wherein at the first position, the second support member includes a rod disposed parallel to the first rotation axis.

8. The accessory of claim 1, wherein the coupler comprises:
a coupling member coupled with at least a part of one surface of the electronic device, facing the at least the part of the one surface of the electronic device;
a protrusion member protruding from one surface of the coupling member; and
a first slot defined on a first side surface among side surfaces of the protrusion member, and
wherein the fixing member is coupled with the coupler by being at least partially accommodated in the first slot.

9. The accessory of claim 8, wherein at the first position, at least one of the hinge member, the first support member, or the second support member is disposed to at least partially surround a side surface of the protrusion member.

10. The accessory of claim 8, wherein the coupler further comprises a second slot defined on a side surface other than the first side surface among the side surfaces of the protrusion member, and
wherein the second slot is configured to be opened or closed by one of the first support member and the second support member, along with pivoting of the support.

11. The accessory of claim 8, wherein the support further comprises a third support member extending from an end of the second support member and disposed parallel to the first support member, and
wherein the third support member is configured to revolve around the first rotation axis along with rotation of the hinge member around the first rotation axis, and revolve around the second rotation axis along with rotation of the first support member around the second rotation axis.

12. The accessory of claim 11, wherein the coupler further comprises a second slot defined on a side surface other than the first side surface among the side surfaces of the protrusion member, and
wherein the second slot is configured to be opened or closed by one of the first support member, the second support member, and the third support member, along with rotation of the support.

13. The accessory of claim 8, wherein the coupler further comprises at least one of a battery accommodated in the protrusion member, a near field communication (NFC) antenna, a wireless power transmission/reception antenna, a storage medium reader, or an integrated circuit (IC) chip reader.

14. An electronic device comprising:
a body; and
an accessory detachably attachable to the body,
wherein the accessory comprises:
a coupler detachably attachable to at least one surface of the body; and
a support coupled with the coupler to be pivotable between a first position at which the support contacts one surface of the coupler and a second position at which the support is inclined to the one surface of the coupler, and wherein the support comprises:
a fixing member coupled with the coupler;
a hinge member coupled with the fixing member, wherein the hinge member rotates around a first rotation axis with respect to the fixing member;
a first support member coupled with the hinge member, wherein the first support member pivots around the first rotation axis along with a rotation of the hinge member, and rotates around a second rotation axis intersecting with the first rotation axis with respect to the hinge member; and
a second support member extending from an end of the first support member, wherein the second support member revolves around the first rotation axis along with a pivoting of the first support member, and pivots around the second rotation axis along with a rotation of the first support member.

15. The electronic device of claim 14, further comprising:
a camera module disposed on one surface of the body; and
an opening area defined by the coupler, and
in a state where the coupler is attached to the body, the opening area is in correspondence with an area in which the camera module is disposed.

16. The electronic device of claim 14, wherein the body performs near field communication (NFC) or wireless power transmission/reception with the accessory.

17. The electronic device of claim 14, wherein the coupler comprises:
- a coupling member coupled with at least a part of one surface of the body, facing the at least the part of the one surface of the body;
- a protrusion member protruding from one surface of the coupling member; and
- a first slot defined on a first side surface among side surfaces of the protrusion member, and
- wherein the fixing member is coupled with the coupler by being at least partially accommodated in the first slot.

18. The electronic device of claim 17, wherein the coupler further comprises a second slot defined on a side surface other than the first side surface among the side surfaces of the protrusion member, and wherein the second slot is opened or closed by one of the first support member and the second support member, along with a pivoting of the support.

19. The electronic device of claim 17, wherein the coupler further comprises at least one of a battery accommodated in the protrusion member, a near field communication (NFC) antenna, a wireless power transmission/reception antenna, a storage medium reader, or an integrated circuit (IC) chip reader.

20. The electronic device of claim 14, wherein the support further comprises a third support member extending from an end of the second support member and disposed parallel to the first support member, and
- wherein the third support member revolves around the first rotation axis along with rotation of the hinge member around the first rotation axis, and revolves around the second rotation axis along with rotation of the first support member around the second rotation axis.

* * * * *